Nov. 15, 1966     T. J. SWEGER     3,285,570
CHAIN TENSIONING MEANS COMPRISING A COMBINED SPROCKET
AND RATCHET WHEEL AND A PAWL THEREFOR HAVING A FORCE
APPLIED THERETO CORRESPONDING TO THE
TENSION ON THE CHAIN
Filed Aug. 20, 1965     2 Sheets-Sheet 1
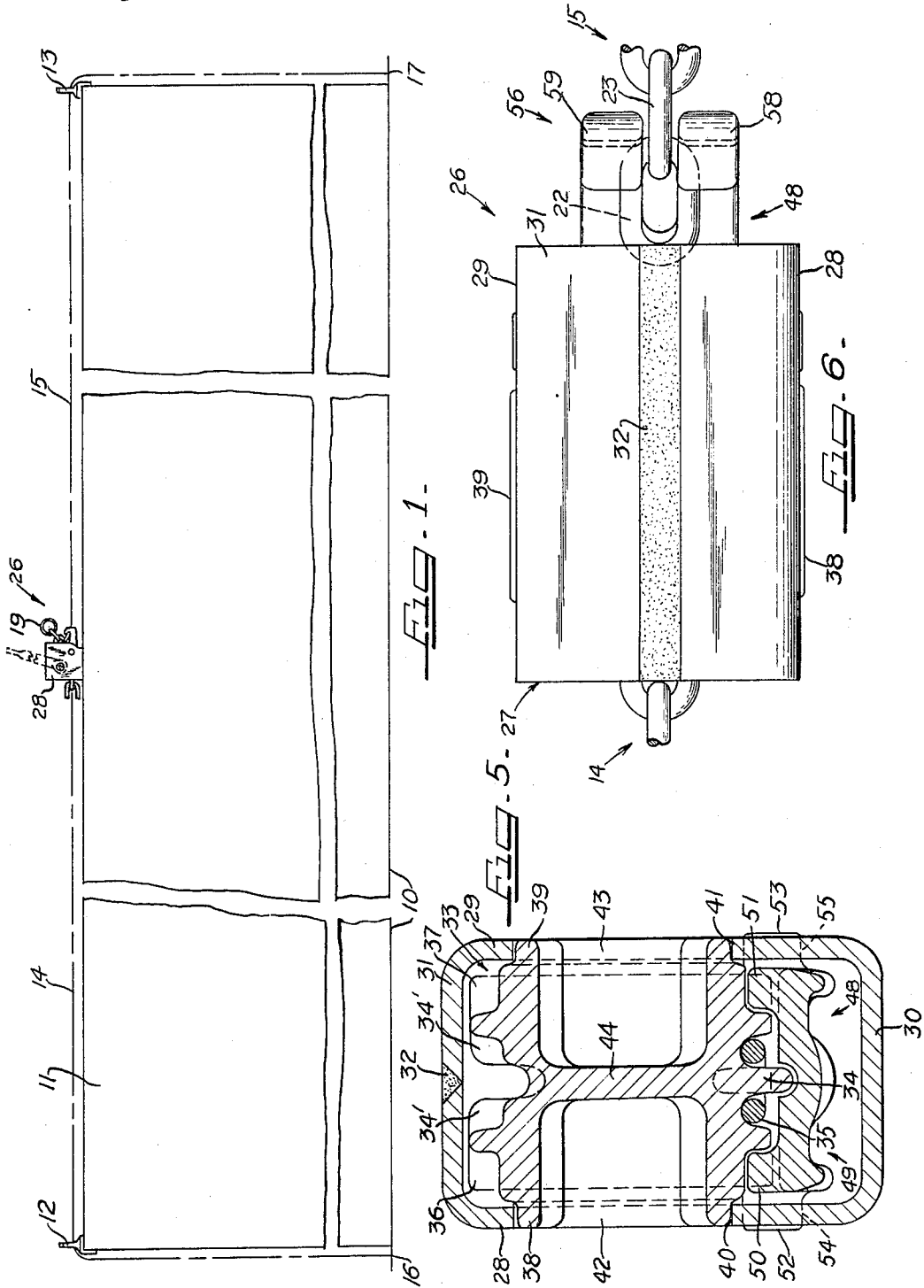

Nov. 15, 1966 T. J. SWEGER 3,285,570
CHAIN TENSIONING MEANS COMPRISING A COMBINED SPROCKET
AND RATCHET WHEEL AND A PAWL THEREFOR HAVING A FORCE
APPLIED THERETO CORRESPONDING TO THE
TENSION ON THE CHAIN
Filed Aug. 20, 1965 2 Sheets-Sheet 2
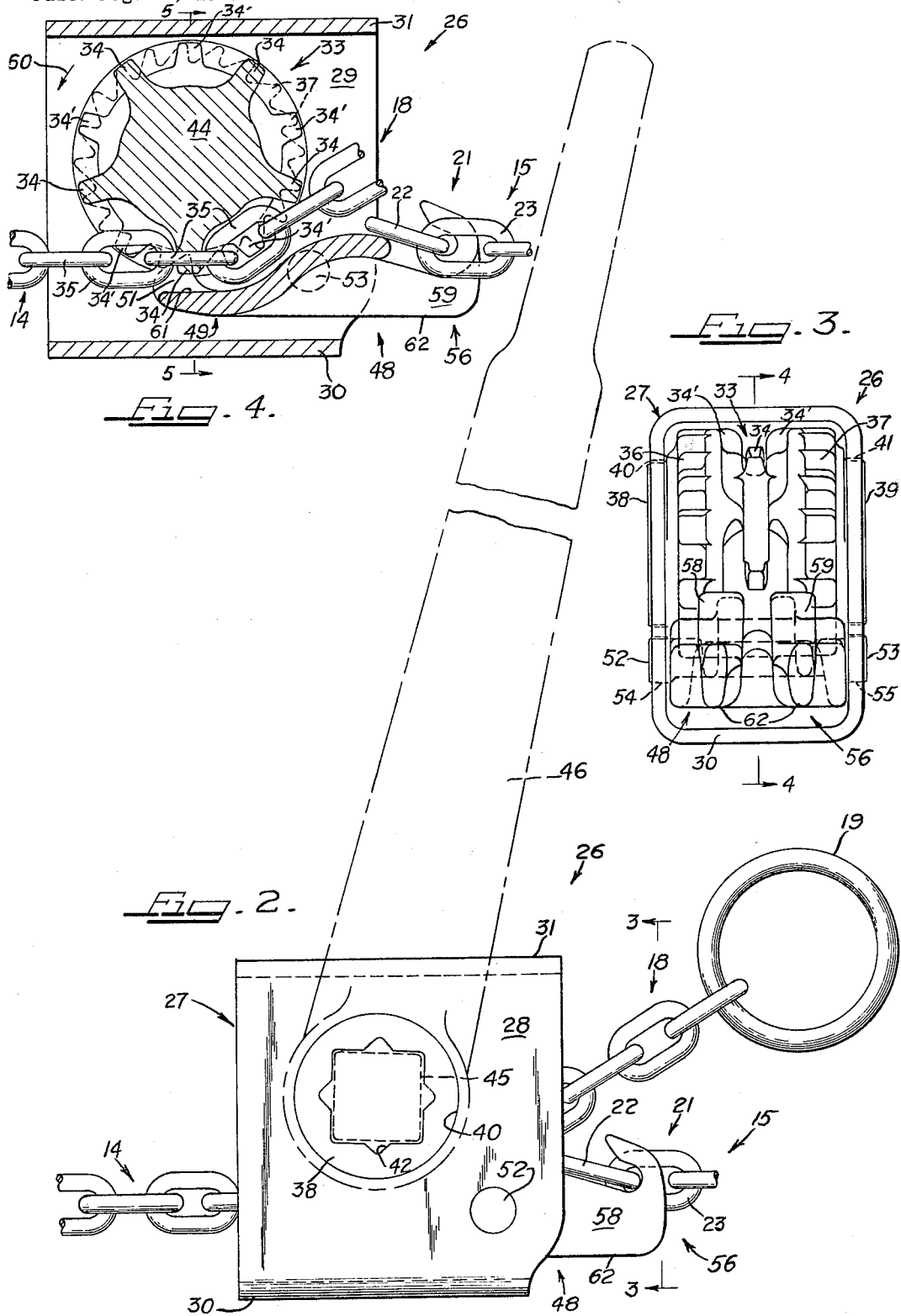

United States Patent Office 3,285,570
Patented Nov. 15, 1966

3,285,570
CHAIN TENSIONING MEANS COMPRISING A COMBINED SPROCKET AND RATCHET WHEEL AND A PAWL THEREFOR HAVING A FORCE APPLIED THERETO CORRESPONDING TO THE TENSION ON THE CHAIN
Theodore J. Sweger, Naperville, Ill., assignor to Illinois Railway Equipment Company, Chicago, Ill., a corporation of Illinois
Filed Aug. 20, 1965, Ser. No. 481,277
10 Claims. (Cl. 254—74)

This invention relates, generally, to means for tying lading, such as lumber, wallboard, and the like, to beds of railway flat cars, trucks and the like and more particularly to means for tensioning chains employed for this and similar purposes.

Among the objects of this invention are: To provide improved means for tensioning chains employed for tying lading in place on the beds of flat cars, trucks and the like and for tensioning chains or other tension devices where such action is desired; to tension a chain for these purposes by rotating a chain sprocket wheel in a forward direction and preventing reverse rotation thereof by a pawl controlled by the tension of the chain and cooperating with the ratchet teeth on the wheel; and to provide a chain tightening mechanism requiring only a housing, a tool operated combination sprocket and ratchet wheel, and a chain tensioned pawl.

In the drawings: FIG. 1 is an end view of lading on a flat bed of a railway car or truck and shows how chain tightening means constructed in accordance with this invention can be employed for tensioning tying chains anchored at their ends to the bed and extending part way around the lading and toward each other; FIG. 2 is a view, in side elevation and at an enlarged scale, of the chain tensioning means shown in FIG. 1; FIG. 3 is a view taken generally along the line 3—3 of FIG. 2 and showing in end elevation the chain tensioning means, the chains being omitted; FIG. 4 is a vertical sectional view taken generally along the line 4—4 of FIG. 3; FIG. 5 is a vertical sectional view taken generally along the line 5—5 of FIG. 4; FIG. 6 is a top plan view of the chain tensioning means.

In FIG. 1, 10 is the bed of a railway flat car, truck or trailer on which lading 11, such as wallboard, plywood, etc., is positioned and provided with corner brackets 12 and 13 over which lading tying chains 14 and 15 are trained. The lading tying chains 14 and 15 are suitably anchored at 16 and 17 to the bed 10. A free end 18, FIG. 2, of the chain 14 extends through chain tensioning means and is provided with a grab ring 19. A free end 21 of the lading tying chain 15 includes an end link 22 and a next link 23 the purpose of which will be described presently. While the lading tying chains 14 and 15 are illustrated as extending entirely from the anchor points 16 and 17, it will be understood that these may be cables, ropes, etc., and that suitable connections can be made to the free ends 18 and 21 as may be desired.

For tensioning the lading tying chains 14 and 15 a three part chain tensioning means 26 is provided. One of the parts for the chain tensioning means 26 is a frame 27 that is formed of pressed steel and provides a housing having a rectangular opening with side walls 28 and 29, a bottom wall 30 and a top wall 31, the latter being in two sections. The frame 27 is formed from flat plate to the configuration shown and, as a final assembly step, the two sections of the top wall 31 are welded together as indicated at 32.

Mounted within the frame 27 is a second part of the chain tensioning means which comprises a chain take up combination sprocket and ratchet wheel 33. The wheel 33 preferably is formed of pearlitic malleable iron. It is provided with integral central sprocket teeth 34 and side sprocket teeth 34' for cooperating with links 35 of the free end 18 of the lading tying chain 14 for tensioning it and at the same time tensioning the lading tying chain 15. The sprocket teeth 34 and 34' are flanked by sets 36 and 37 of ratchet teeth that are formed integrally with the wheel 33. Also formed integrally with the wheel 33 are hollow hubs 38 and 39 that extend laterally through and are journaled in openings 40 and 41 in the side walls 28 and 29. Noncircular openings 42 and 43 extend from opposite sides of the wheel 33 and are separated by a web 44 centrally thereof. The openings 42 and 43 provide sockets for receiving a square shank 45, FIG. 2, of a socket wrench that may be provided with a handle 46 to obtain the necessary leverage for rotating the wheel 33 to tension the chains 14 and 15.

The third part of the chain tensioning means 26 is a pawl that is indicated, generally, at 48, is formed of malleable iron and has a bifurcated ratchet tooth engaging end 49 the toothed furcations 50 and 51 of which straddle the sprocket teeth 34 and 34' and are arranged to engage, respectively, the teeth of the sets 36 and 37 of ratchet teeth to hold the wheel 33 against reverse movement. The pawl 48 has laterally extending integrally formed hubs 52 and 53 which extend through and are journaled in openings 54 and 55 in the side walls 28 and 29 of the frame 27. The axis of rotation of the pawl 48 through the hubs 52 and 53 is located between the bifurcated ratchet tooth engaging end 49 of the pawl 48 and anchor means at the other end in the form of a bifurcated hook that is indicated generally at 56. Hook shaped furcations 58 and 59 are arranged to receive the end link 22 against the bights thereof while the next link 23 is located therebetween as shown in FIG. 6. The position of the area of engagement between the end link 22 and the bights of the hook shaped furcations 58 and 59 is such that tension applied by the lading tying chain 15 acts to rotate the pawl 48 in a clockwise direction, as viewed in FIG. 4, to maintain the toothed furcations 50 and 51 at the other end in ratcheting engagement with the ratchet teeth 36 and 37.

In operation, as the wheel 33 is rotated in a counter clockwise direction indicated by arrow 60 in FIG. 4 by application of the square shank 45 of the socket wrench to one or the other of the noncircular openings 42 or 43, the chain 14 is caused to move through the frame 27 with tension being applied thereto and a corresponding tension being applied to the chain 15. As as free end 18 of the chain 14 moves undereneath the wheel 33, it is held in engagement with the sprocket teeth 34 and 34' thereof by the surface 61 of the pawl 48 between the toothed furcations 50 and 51. The tightening operation continues by continued rotation of the wheel 33 by the handle 46 until the desired tension is developed in the chains 14 and 15. Then the handle 46 and square shank 45 are removed. The tensioning means 26 remains in the locked position as long as the tension continues to be applied to the chains 14 and 15 since the toothed furcations 50 and 51 of the pawl 48 remain in locking engagement with the ratchet teeth 36 and 37.

When it is desired to release the tension of the chains 14 and 15, a blow is struck against an anvil portion 62 on the underside of the anchor means 56. Sufficient force is exerted on the anvil portion 62 to rock the pawl 48 out of locking engagement with the ratchet teeth 36 and 37. The wheel 33 then is permitted to rotate in a clockwise direction to release the tension in the chains 14 and 15.

It will be understood that the chain 14 can be of relatively short length with provision being made at the end away from the chain tensioning means 26 for connection to another chain, a steel cable, etc. Likewise, instead of providing the chain 15, provision can be made for connecting the anchor means 56 to a suitable stationary member in close proximity thereto.

The assembly is made by forming the frame 27 into the rectangular configuration with the wheel 33 and pawl 48 in position therein. Thereafter the two sections of the top wall 31 are welded at 32.

What is claimed as new is:

1. Means for tensioning a chain comprising: a frame, a chain take up wheel journaled in said frame for driving engagement with said chain, ratchet teeth on said wheel, a pawl rotatably mounted on said frame for engaging said ratchet teeth to prevent reverse rotation of said wheel, means for forwardly rotating said wheel to tighten said chain, an anchor means on said pawl having a force applied thereto corresponding to the tension applied by said chain for maintaining said pawl in ratcheting engagement with said ratchet teeth as said wheel is rotated forwardly.

2. Means for tensioning a chain comprising: a frame, a chain take up wheel journaled in said frame for driving engagement with said chain, ratchet teeth on said wheel, a pawl rotatably mounted on said frame for engaging said ratchet teeth to prevent reverse rotation of said wheel, means for forwardly rotating said wheel to tighten said chain, and anchor means on said pawl having a force applied thereto corresponding to the tension applied by said chain for maintaining said pawl in ratcheting engagement with said ratchet teeth as said wheel is rotated forwardly, said pawl having a chain engaging surface whereby said chain is held in driving engagement with said wheel by tension of said chain.

3. Means for tensioning a chain comprising: a frame, a chain take up wheel journaled in said frame for driving engagement with said chain, ratchet teeth on said wheel, a pawl rotatably mounted on said frame for engaging said ratchet teeth to prevent reverse rotation of said wheel, means for forwardly rotating said wheel to tighten said chain, and anchor means on said pawl having a force applied thereto corresponding to the tension applied by said chain for maintaining said pawl in ratcheting engagement with said ratchet teeth as said wheel is rotated forwardly, the axis of rotation of said pawl on said frame being located between the ratchet teeth engaging portion of said pawl and said anchor means.

4. Means for tensioning a chain comprising: a frame, a chain take up wheel journaled in said frame for driving engagement with said chain, ratchet teeth on said wheel, a pawl rotatably mounted on said frame for engaging said ratchet teeth to prevent reverse rotation of said wheel, means for forwardly rotating said wheel to tighten said chain, anchor means on said pawl having a force applied thereto corresponding to the tension applied by said chain for maintaining said pawl in ratcheting engagement with said ratchet teeth as said wheel is rotated forwardly, and an anvil portion on said pawl adjacent said anchor means to receive a hammer blow to rotate said pawl and disengage it from said ratchet teeth for releasing the tension in said chain.

5. Means for tensioning a chain comprising: a frame, a chain take up wheel journaled in said frame for driving engagement with said chain, ratchet teeth on said wheel, a pawl rotatably mounted on said frame for engaging said ratchet teeth to prevent reverse rotation of said wheel, means for forwardly rotating said wheel to tighten said chain, and anchor means on said pawl having a force applied thereto corresponding to the tension applied by said chain for maintaining said pawl in ratcheting engagement with said ratchet teeth as said wheel is rotated forwardly, said anchor means being bifurcated to receive a chain link endwise with the next link between the furcations.

6. Means for tensioning a chain comprising: a frame, a chain take up wheel journaled in said frame and having sprockets for driving engagement with said chain, ratchet teeth on opposite sides of said sprockets on said wheel, a pawl rotatably mounted on said frame for straddling said sprockets and engaging both sets of ratchet teeth to prevent reverse rotation of said wheel, means for forwardly rotating said wheel to tighten said chain, and anchor means on said pawl having a force applied thereto corresponding to the tension applied by said chain for maintaining said pawl in ratcheting engagement with said ratchet teeth as said wheel is rotated forwardly.

7. Means for tensioning a chain comprising: a one piece frame having a generally rectangular opening therethrough, a chain take up wheel having hollow hubs journaled in opposite side walls of said frame, said hubs having noncircular tool receiving openings for rotating said wheel, said wheel having sprockets for driving engagement with said chain, said sprockets being flanked by ratches teeth, a pawl having hubs journaled in said side walls and straddling said sprockets for engaging both sets of ratchet teeth to prevent reverse rotation of said wheel, and anchor means on said pawl having a force applied thereto corresponding to the tension applied by said chain on rotation of said wheel in a forward direction for maintaining said pawl in ratcheting engagement with said ratchet teeth.

8. Means for tensioning a chain comprising: a one piece frame having a generally rectangular opening therethrough, a chain take up wheel having hollow hubs journaled in opposite side walls of said frame, said hubs having noncircular tool receiving openings for rotating said wheel, said wheel having sprockets for driving engagement with said chain, said sprockets being flanked by ratchet teeth, a pawl having hubs journaled in said side walls and straddling said sprockets for engaging both sets of ratchet teeth to prevent reverse rotation of said wheel, and anchor means on said pawl having a force applied thereto corresponding to the tension applied by said chain on rotation of said wheel in a forward direction for maintaining said pawl in ratcheting engagement with said ratchet teeth, said pawl having a chain engaging surface between the ratchet teeth engaging portions thereof for holding said chain on said sprocket by tension of said chain.

9. Means for tensioning a chain comprising: a one piece frame having a generally rectangular opening therethrough, a chain take up wheel having hollow hubs journaled in opposite side walls of said frame, said rubs having noncircular tool receiving openings for rotating said wheel, said wheel having sprockets for driving engagement with said chain, said sprockets being flanked by ratchet teeth, a pawl having hubs journaled in said side walls and straddling said sprockets for engaging both sets of ratchet teeth to prevent reverse rotation of said wheel, and anchor means on said pawl having a force applied thereto corresponding to the tension applied by said chain on rotation of said wheel in a forward direction for maintaining said pawl in ratcheting engagement with said ratchet teeth, said pawl having a chain engaging surface between the ratchet teeth engaging portions thereof for holding said chain on said sprockets by tension of said chain, the axis of rotation of said pawl in said side walls being located between the ratchet teeth engaging portions of said pawl and said anchor means.

10. Means for tensioning a chain comprising: a one piece frame having a generally rectangular opening therethrough, a chain take up wheel having hollow hubs journaled in opposite side walls of said frame, said hubs having noncircular tool receiving openings for rotating said wheel, said wheel having sprockets for driving engagement with said chain, said sprockets being flanked by ratchet teeth, a pawl having hubs journaled in said side walls and straddling said sprockets for engaging both sets of ratchet teeth to prevent reverse rotation of said wheel, and anchor means on said pawl having a force applied thereto corresponding to the tension applied by said chain on rotation of said wheel in a forward direction for maintaining said pawl in ratcheting engagement with said ratchet teeth, said pawl having a chain engaging surface between the ratchet teeth engaging portions thereof for holding said chain on said sprockets by tension of said chain, the axis of rotation of said pawl in said side walls being located between the ratchet teeth engaging portions of said pawl and said anchor means, and an anvil portion on said pawl adjacent said anchor means to receive a hammer blow to rotate said pawl and disengage it from said ratchet teeth for releasing the tension in said chain.

References Cited by the Examiner

UNITED STATES PATENTS

| | | | |
|---|---|---|---|
| 737,846 | 9/1903 | Jennings | 254—161 |
| 1,030,588 | 6/1912 | Jones | 254—74 |
| 1,196,591 | 8/1916 | Sapp et al. | 254—161 |
| 3,120,375 | 2/1964 | Haynes | 280—179 X |
| 3,187,686 | 6/1965 | De Podesta | 280—179 X |

WILLIAM FELDMAN, *Primary Examiner.*

MILTON S. MEHR, *Examiner.*

UNITED STATES PATENT OFFICE
CERTIFICATE OF CORRECTION

Patent No. 3,285,570　　　　　　　　　　　　November 15, 1966

Theodore J. Sweger

It is hereby certified that error appears in the above numbered patent requiring correction and that the said Letters Patent should read as corrected below.

Column 4, line 18, for "ratches" read -- ratchet --; line 47, for "rubs" read -- hubs --; column 5, after line 12, insert the following:

11. Means for tensioning a chain comprising: a one piece frame having a generally rectangular opening therethrough, a chain take up wheel having hollow hubs journaled in opposite side walls of said frame, said hubs having non-circular tool receiving openings for rotating said wheel, said wheel having sprockets for driving engagement with said chain, said sprockets being flanked by ratchet teeth, a pawl having hubs journaled in said side walls and straddling said sprockets for engaging both sets of ratchet teeth to prevent reverse rotation of said wheel, and anchor means on said pawl having a force applied thereto corresponding to the tension applied by said chain on rotation of said wheel in a forward direction for maintaining said pawl in ratcheting engagement with said ratchet teeth, said pawl having a chain engaging surface between the ratchet teeth engaging portions thereof for holding said chain on said sprockets by tension of said chain, the axis of rotation of said pawl in said side walls being located between the ratchet teeth engaging portions of said pawl and said anchor means, and an anvil portion on said pawl adjacent said anchor means to receive a hammer blow to rotate said pawl and disengage it from said ratchet teeth for releasing the tension in said chain, said anchor means being bifurcated to receive a chain link endwise with the next link between the furcations.

3,285,570 in the heading to the printed specification, line 11, for "10 Claims" read -- 11 Claims --.

Signed and sealed this 12th day of September 1967.

(SEAL)
Attest:

ERNEST W. SWIDER  
Attesting Officer

EDWARD J. BRENNER  
Commissioner of Patents